(12) United States Patent
Bonhoure et al.

(10) Patent No.: US 9,466,217 B2
(45) Date of Patent: Oct. 11, 2016

(54) METHOD FOR SUPPORTING A DRIVER USING A PORTABLE DEVICE IN A VEHICLE

(75) Inventors: Patrick Bonhoure, Annemasse (FR); Siav Kuong Kuoch, Saint Maur des Fosses (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 20 days.

(21) Appl. No.: 14/118,264

(22) PCT Filed: May 20, 2011

(86) PCT No.: PCT/EP2011/058279
§ 371 (c)(1),
(2), (4) Date: Nov. 18, 2013

(87) PCT Pub. No.: WO2012/159650
PCT Pub. Date: Nov. 29, 2012

(65) Prior Publication Data
US 2014/0085113 A1 Mar. 27, 2014

(51) Int. Cl.
*B60Q 1/00* (2006.01)
*G08G 1/16* (2006.01)
*B60K 35/00* (2006.01)
*B60W 50/14* (2012.01)

(52) U.S. Cl.
CPC ............... *G08G 1/168* (2013.01); *B60K 35/00* (2013.01); *B60K 2350/106* (2013.01); *B60K 2350/1088* (2013.01); *B60K 2350/965* (2013.01); *B60Q 1/00* (2013.01); *B60W 2050/143* (2013.01); *B60W 2050/146* (2013.01)

(58) Field of Classification Search
CPC ........................................................ B60Q 1/00
USPC .............................. 340/432.2, 903, 435, 436
See application file for complete search history.

(56) References Cited

U.S. PATENT DOCUMENTS

| 5,059,946 | A | * | 10/1991 | Hollowbush | ................. 340/435 |
| 5,701,122 | A | * | 12/1997 | Canedy | ....................... 340/932.2 |
| 6,133,826 | A | * | 10/2000 | Sparling | ....................... 340/436 |
| 2003/0108212 | A1 | * | 6/2003 | Yun | ................................. 381/86 |

(Continued)

FOREIGN PATENT DOCUMENTS

| DE | 10 2007 058 542 A1 | 6/2009 |
| DE | 10 2010 006 635 A1 | 4/2011 |

OTHER PUBLICATIONS

International Search Report for corresponding International Application No. PCT/EP2011/058279, mailed Jul. 27, 2011 (2 pages).

*Primary Examiner* — Brent Swarthout
(74) *Attorney, Agent, or Firm* — Osha Liang LLP

(57) ABSTRACT

The invention relates to a method for supporting a driver of a motor vehicle (2) while driving the vehicle (2), wherein a sound signal indicating an information generated by a driver assistance system (3) of the vehicle (2) is output by a sound output device (7, 8) of the driver assistance system (3). The method comprises receiving acoustic sound by a microphone of a portable communication device (9) and checking by the portable communication device (9) whether or not the received acoustic sound comprises the sound signal of the driver assistance system (3) as well as, upon detecting the sound signal of the driver assistance system (3), generating a display (15) on a display means (14) of the portable communication device (9) in dependence on the information extracted from the sound signal.

14 Claims, 4 Drawing Sheets

(56) References Cited

U.S. PATENT DOCUMENTS

Figure 1:
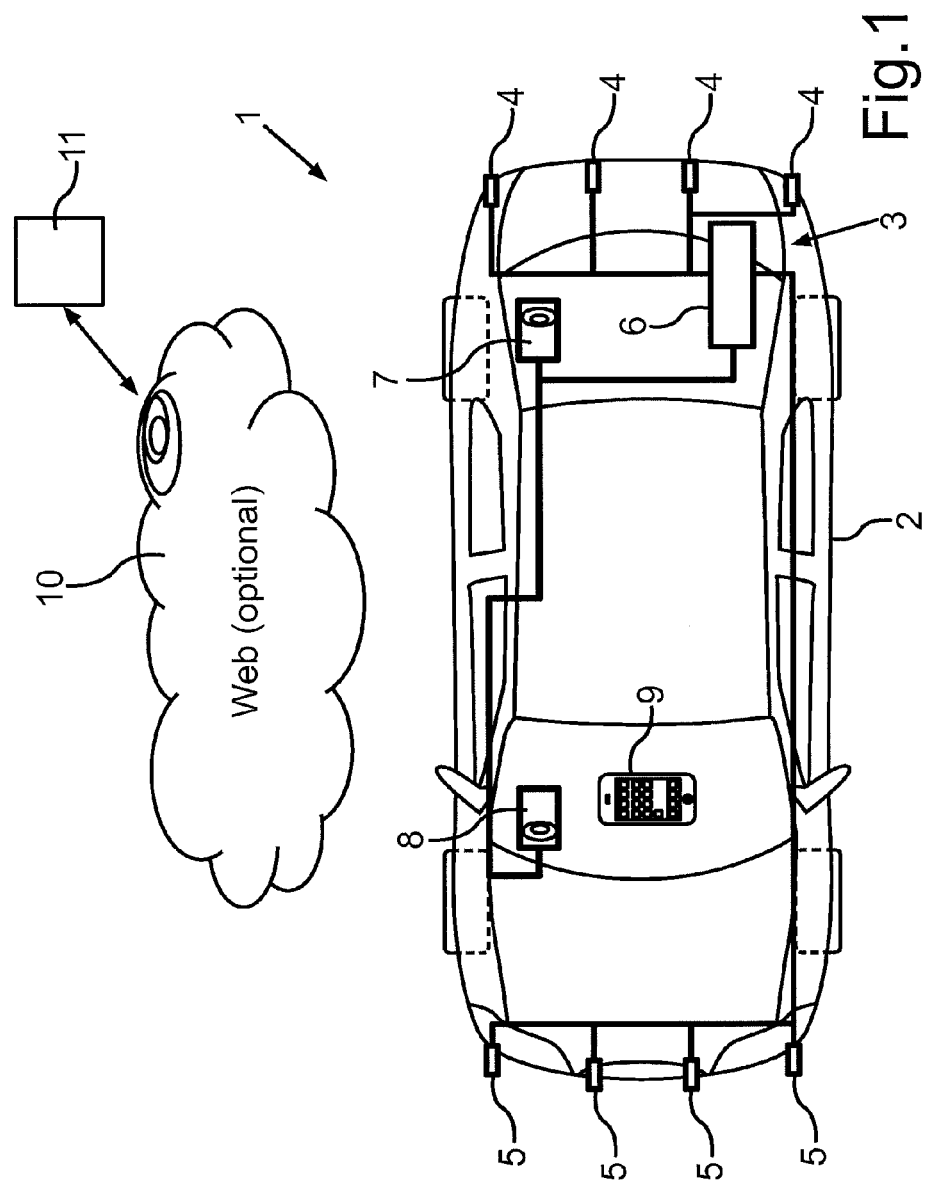

2003/0141965 A1* 7/2003 Gunderson et al. .......... 340/431
2009/0091433 A1 4/2009 Rubins et al.
2010/0136944 A1 6/2010 Taylor et al.
2010/0332080 A1 12/2010 Bae

* cited by examiner

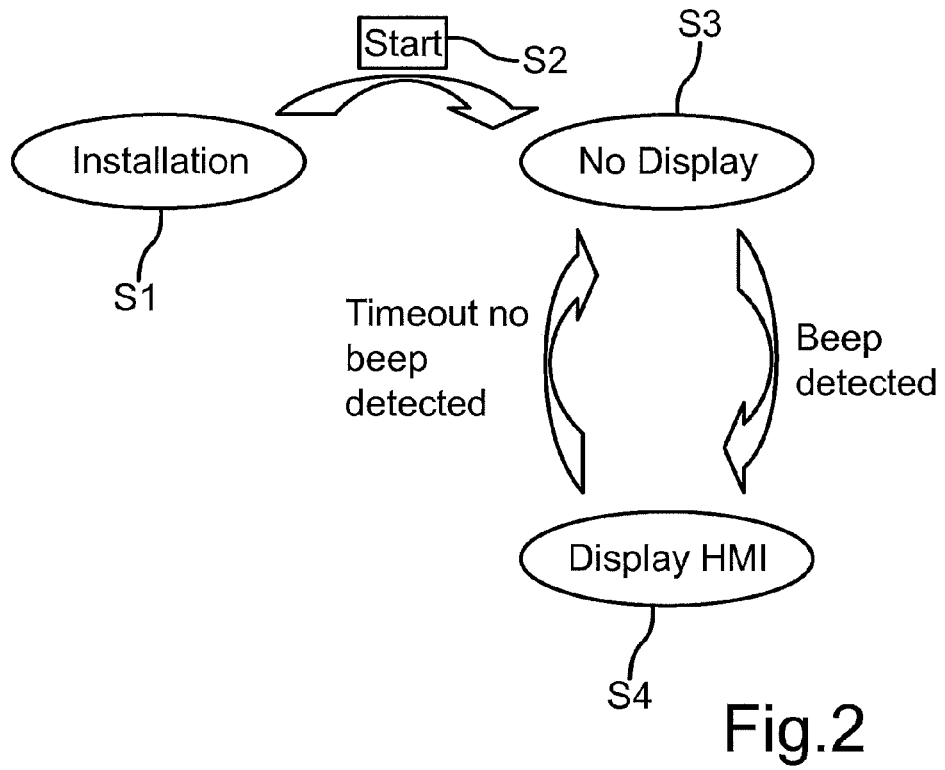
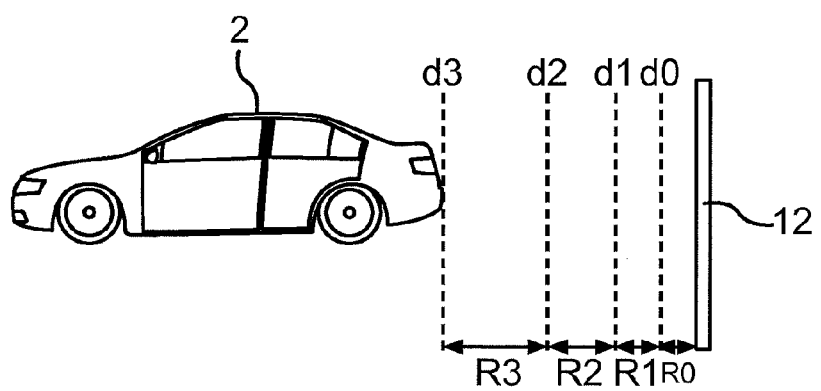

METHOD FOR SUPPORTING A DRIVER USING A PORTABLE DEVICE IN A VEHICLE

The invention relates to a method for supporting a driver of a motor vehicle while driving the vehicle, wherein a sound signal indicating an information generated by a driver assistance system of the vehicle is output by a sound output device of the driver assistance system. Moreover, the invention relates to a computer program product for performing such a method, to a portable communication device as well as to a system for a motor vehicle.

The document US 2010/0136944 A1 describes a method, wherein a triggering event causes a telematics device to transmit information to a user device. The user device generates an alert in response to the transmitted information, producing the alert, for example, graphically, audibly, textually, or using a combination thereof. This method serves for vehicle interaction utilizing a telematics control unit (TCU) device coupled to a vehicle. A user may associate a trigger event with a corresponding stimulus, or a task. The user may select the stimulus and the trigger as the same action. The user may perform the association of a trigger with a task, or a stimulus, using a computer device located remotely from the vehicle in which the task, or stimulus, occurs. The computer device could be a personal computer, a telephone device, a wireless device or other electronic devices that can couple to a communications network and transmit and receive electronic messages thereto and therefrom, respectively. A triggering event may be the attaining of a certain location of the TCU along a predetermined commute route. Upon the triggering event occurring, the TCU can formulate a message, for example, calculate time of arrival based on the traffic conditions and speed limits along the commute route. The TCU may also transmit its location information to another device, such as the user device.

The document US 2010/0332080 A1 discloses a method which serves for providing assistance to a driver for parking a vehicle. This method includes detection of a parking space and a location of the vehicle for vehicle parking. A feasibility for parking the vehicle is determined based on the space; a parking path is calculated based on the space and the location of the vehicle. The method generates a constant target position of a steering wheel based on the parking path. A first human-machine interface (HMI) signal is generated that instructs the driver to turn the steering wheel based on the target position, wherein the first HMI signal is generated when the vehicle is not moving. The steering wheel angle is monitored by comparing the steering wheel angle with the constant target position as well detecting that the steering wheel angle reaches a proximity of the target position. A second HMI signal is generated that instructs the driver to hold the steering wheel, wherein the second HMI signal is generated when the steering wheel angle has reached the proximity of the target position. A vehicle motion comment is generated after the steering wheel angle is held steadily according to the second HMI signal. A central processing module may be implemented by a hand-held electronic device that includes a microprocessor or microcomputer and a signal interface circuit that receives vehicle signals via wired or wireless signal interface.

In the present case, the interest is focussed on a park assistant system of a motor vehicle, in particular an ultrasonic park assistant system. Ultrasonic park assistant systems are already well known from the prior art and comprise a number of ultrasonic sensors which are located on the front bumper of the vehicle on the one hand as well on the rear bumper on the other hand. Such sensors send ultrasonic signals that are reflected on obstacles being present in the surroundings of the vehicle. The reflected signals are received by the ultrasonic sensors, and the respective distance between the vehicle and the obstacles can be determined based on the received ultrasonic signals. The distance can then be indicated to the driver of the vehicle. In such a way, the driver is supported while parking the vehicle into a parking space, for example. Namely, the measured distance can be indicated to the driver by means of a sound signal generated by the driver assistance system, i.e. by its sound output device. It is already well known to output a sound signal which comprises beeps, the repetition rate of which is set based on the measured distance. Also, a display device can be provided within the vehicle, and the measured distance can also be indicated by means of the display device. However, the following applies to the park assistant systems: Nowadays, only the upper class cars and luxury cars are equipped with such display devices, whereas entry-level cars usually do not have such displays. Entry-level cars as a rule are equipped only with a sound output device, i.e. with a speaker for outputting the beeps.

Thus, such driver assistance systems belong to the prior art, which are equipped with a speaker, but have no display device. In such systems, information generated by the system—the measured distance to the obstacle, for example—can only be output by the speaker.

It is an object of the invention to demonstrate a solution, how in a method of the initially mentioned kind the driver of the vehicle can reliably be supported while driving the vehicle, even if the driver assistance system is not equipped with a display device.

According to the invention, this object is solved by a method having the features according to claim 1 as well as by a computer program product having the features according to claim 14. Advantageous implementations of the invention are subject matter of the dependent claims, of the description and of the figures.

In a method according to the invention, a driver of a motor vehicle is supported by means of a driver assistance system while driving the vehicle. A sound signal indicating an information generated by the driver assistance system is output by a sound output device (speaker, for instance) of the driver assistance system. In the method, acoustic sound is received by a microphone of a portable communication device. The portable communication device checks whether or not the received acoustic sound comprises the specific sound signal of the driver assistance system. Upon detecting the sound signal of the driver assistance system, a display is generated on a display means of the portable communication device in dependence on the information extracted from the sound signal.

Thus, according to the invention, a portable communication device—a smart phone or a PDA (personal digital assistant), for example—is provided separately to and independently of the motor vehicle, the portable communication device being adapted to receive acoustic sound through a microphone and to detect a predefined sound signal generated by the driver assistance system of the motor vehicle. The information generated by the driver assistance system is extracted from the received sound signal by the portable communication device; based on the information or based on the detected sound signal a display is generated on a display means of the portable communication device. This means that the portable communication device is able to display a graphic or an image which depends on the information generated by the driver assistance system, so actually on the detected sound signal. In this way, the driver can be provided with optical information or with an optical display, even if such a display is not provided in the motor vehicle. Thus, the driver can be reliably supported while driving the vehicle, even if the vehicle is not equipped with a display device or a functionality for providing such display information. The portable communication device can be used even in an entry-level vehicle.

The portable communication device, according to the invention, is a hand-held device, which is provided separately to the motor vehicle. It can be a smart phone or a PDA of the driver, for example. The invention is based on the realization that such devices as a rule have a display and a powerful processor which can process the received acoustic sound and detect the specific sound signal of the driver assistance system. Furthermore, the invention is based on the realization that the portable communication devices known from the prior art have a microphone, which allows to receive acoustic sound and thus the specific sound signal of the driver assistance system.

As already explained, in the present case, the interest is focussed particularly on a park assistant system of the motor vehicle. For supporting the driver while manoeuvring the vehicle, a distance between the vehicle and an obstacle external to the vehicle can be measured by means of a sensing device of the driver assistance system. In this embodiment, the output sound signal indicates the measured distance as the information, and the display on the display means of the portable communication device is generated in dependence on the measured distance. In particular, the generated display indicates the measured distance. In this way, the driver can be informed about the distance between the vehicle and the obstacle by means of the portable communication device, namely through the display means. On the display means, the driver can directly notice the measured distance between the vehicle and the obstacle.

The measured distance can be indicated by the display means in such a way that the generated display comprises a vehicle image, which shows a plan view of the vehicle, for example, as well as a distance indicating image, which illustrates the measured distance. In this way, the driver can be reliably informed about the measured distance by means of the display means. In one embodiment, the distance indicating image comprises bars—or at least one bar—, and the number of the bars can be set in dependence on the measured distance, i.e. in dependence on the received sound signal. The bars can be displayed behind or in front of the vehicle image, namely depending on the fact whether the obstacle is detected in front of or behind the vehicle, respectively. By means of said bars, the driver can easily notice the distance between the vehicle and the obstacle.

The sensor device, by means of which the distance is measured, can be an ultrasonic sensor device. Such devices, as a rule, are provided in modern vehicles.

As already explained, the driver assistance system can be a park assistant system. Thus, the driver can be reliably supported while parking the vehicle into a parking space. A collision between the vehicle and the obstacle can be prevented while parking the vehicle.

In one embodiment, to determine the distance based on the sound signal, beeps of the sound signal are detected and a repetition rate of the beeps is determined by the portable communication device. This embodiment is based on the fact that the sound signal generated by ultrasonic park assistant systems usually comprises beeps, the repetition rate of which is set in dependence on the measured distance. Determining the repetition rate of the beeps allows to calculate the distance or at least a range of distance based on the received sound signal.

In one embodiment, it is provided that the functionality of detecting the specific sound signal in the received acoustic sound is installed on the portable communication device as a computer program, i.e. an application. This application can be launched on the portable communication device to make the portable communication device check the received acoustic sound for the presence of the specific signal of the driver assistance system. If the application is launched, it can be continuously checked by the portable communication device whether or not the sound signal is present in the received acoustic sound. The display indicating the information can be generated upon detecting the sound signal. This means that the portable communication device can check continuously "in the background" whether or not the received acoustic sound comprises the predefined sound signal of the driver assistance system. Thus, the sound signal generated by the driver assistance system can be detected quickly by the portable communication device.

After generating the display, too, it can continuously be checked by the portable communication device whether or not the sound signal is still present. The display can be deactivated if no sound signal is detected for a predefined period of time. This period of time can be a value from the range of values from 3 s to 1 min, for instance. It can be a value of 20 s. If no sound signal is detected, thus, the driver can use the portable communication device for other applications.

Thus, the portable communication device can detect the specific sound signal in the received acoustic sound. For detecting the sound signal, a comparison signal can be provided in the portable communication device and the received acoustic sound can be compared with the comparison signal. For example, a comparison frequency and/or assigned comparison amplitude can be stored in the portable communication device. In this way, different sound signals of the driver assistance system can be independently detected by the portable communication device. In one embodiment, an Internet connection is provided between the portable communication device and a database. The comparison signal can then be downloaded from the database through the Internet for a given vehicle model and/or a vehicle's year of manufacture. Thus, for different vehicles, different comparison signals can be downloaded by the portable communication device. This allows to use the portable communication device with different vehicle models as well as with vehicles of different ages.

For detecting the sound signal, a frequency and/or an amplitude of the received acoustic sound can be analyzed by the portable communication device. Through analyzing the frequency and/or the amplitude of the received sound and comparing the frequency and/or the amplitude with a comparison frequency and/or comparison amplitude, respectively, incorrect detections can be prevented. Furthermore, many different sound signals of the driver assistance system can be detected, which have different frequencies and/or amplitudes. For example, a threshold value can be stored in the portable communication device for at least one frequency component of the specific sound signal. Then, it can be checked whether the amplitude of the received acoustic sound at the predefined frequency value is greater then the predefined threshold value. In this case, the received sound can be interpreted as the specific sound signal of the driver assistance system.

A computer program product according to the invention is formed for performing a method according the invention, when it is installed and launched on a portable communication device.

Furthermore, according to the invention, a portable communication device is provided, which comprises a microphone for receiving acoustic sound, a controller for processing the received sound, and a display means. The controller is adapted to detect in the received acoustic sound a predefined sound signal of a driver assistance system of a vehicle, to extract information from the sound signal generated by the driver assistance system as well as to generate a display (graphic or image) on the display means in dependence on the information.

A system for a vehicle according to the invention comprises a driver assistance system as well as a portable communication device according to the invention.

The preferred embodiments presented with respect to the method according to the invention and the advantages thereof correspondingly apply to the computer program product according to the invention, to the portable communication device according to the invention as well as to the system according to the invention.

Further features of the invention are apparent from the claims, the figures and the description of the figures. All of the features and feature combinations mentioned above in the description as well the features and feature combinations mentioned below in the description of the figures and/or shown in the figures alone are usable not only in the respectively specified combination, but also in other combinations or else alone.

Now, the invention is explained in more detail based on individual preferred embodiments as well as with reference to the attached drawings.

Figure 4:
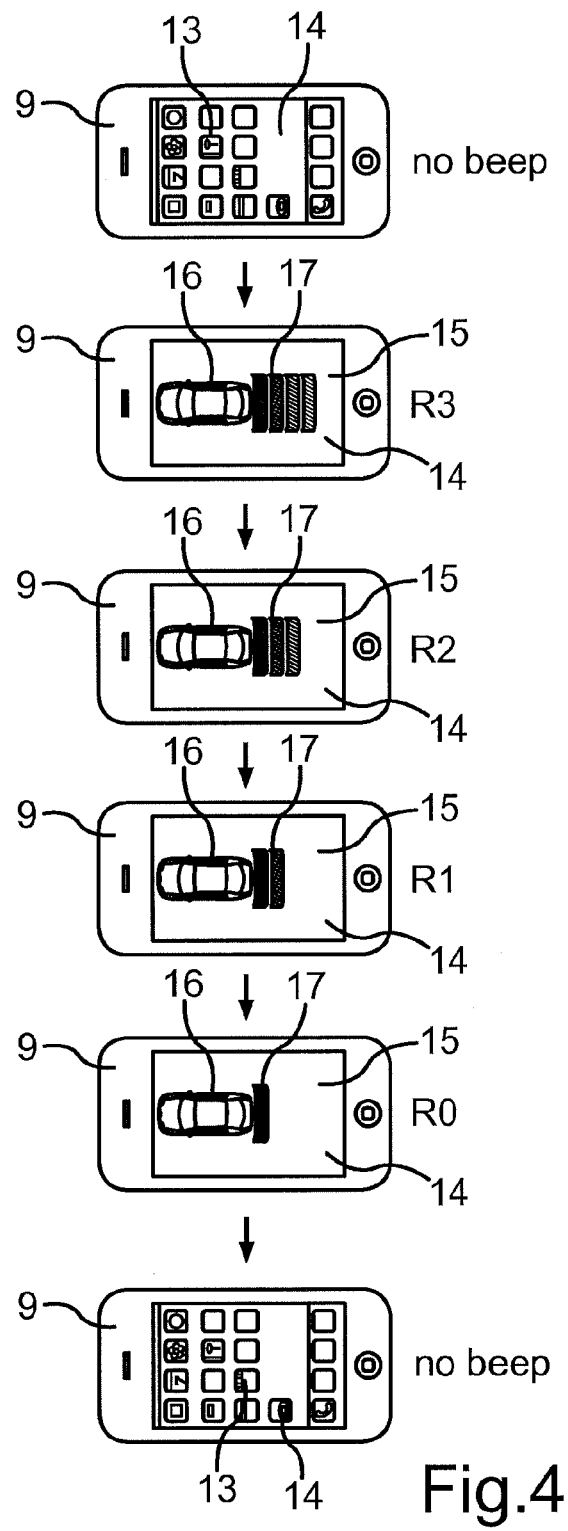
Figure 5:
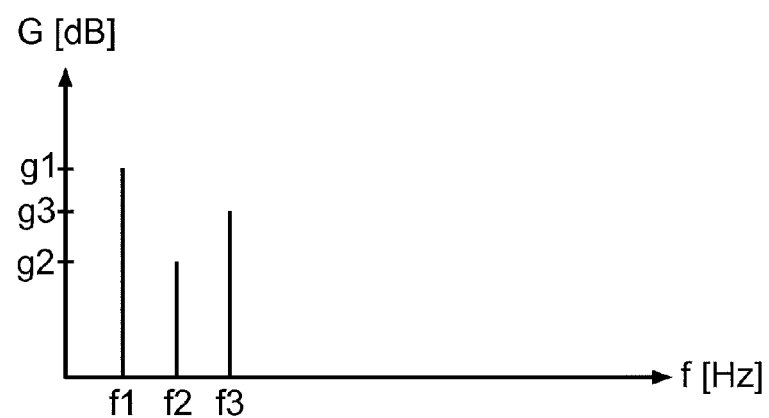

Therein show:

FIG. 1 in a schematic representation a system according to one embodiment of the present invention;

FIG. 2 a flow diagram of a method according to one embodiment of the invention;

FIG. 3 in a schematic representation a vehicle and an obstacle present in the surroundings of the vehicle;

FIG. 4 in a schematic representation a portable communication device according to one embodiment of the invention, wherein different displays are shown depending on a distance between the vehicle and the obstacle; and FIG. 5 an example of a frequency spectrum of a sound beep detected by the portable communication device.

FIG. 1 shows a system 1 according to one embodiment of the invention. The system 1 comprises a motor vehicle 2 (car), which is equipped with a driver assistance system 3. In the present embodiment, the driver assistance system 3 is a park assist system. The driver assistance system 3 comprises a number of ultrasonic sensors 4 mounted on the rear bumper of the vehicle 2. The driver assistance system 3 furthermore comprises further ultrasonic sensors 5 on the front bumper of the vehicle 2. The ultrasonic sensors 4, 5 are electrically coupled to a control device 6 of the driver assistance system 3. The control device 6 receives signals from the ultrasonic sensors 4, 5 and analyzes the signals. The control device 6 can determine a distance between the vehicle 2 and an obstacle in the surroundings of the vehicle 2 based on the signals of the ultrasonic sensors 4, 5. Depending on the distance, the control device 6 controls a first speaker 7 and a second speaker 8. If an obstacle is detected behind the vehicle 2, the control device 6 controls the first speaker 7, which is located in the rear region of the vehicle 2. On the other hand, if an obstacle is detected in front of the vehicle 2, the control device 6 controls the second speaker 8, which is located in the front region of the vehicle 2. The speakers 7, 8 are sound output devices according to the invention.

Each speaker 7, 8 is controlled in such a way that a sound signal is generated, which includes a sequence of beeps. The repetition rate of the beeps is set in dependence on the measured distance. The following relationship can apply: The smaller distance between the vehicle 2 and the obstacle, the higher the repetition rate of the beeps. But, for an extremely small distance, a continuous beep can be output and thus the repetition rate can be equal to zero.

Also, the system 1 comprises a smart phone 9, which is a portable communication device according to the invention. The smart phone 9 is provided separately to and independently of the motor vehicle 2. The smart phone 9 can be any smart phone available on the market, which is equipped with a controller, a display means (such as an LCD-display) as well as a microphone.

Optionally, the smart phone 9 can be connected to the Internet (Web) 10 and through the Internet 10 to a database 11.

The smart phone 9 can continuously receive acoustic sound, namely through its microphone. The controller of the smart phone 9 can continuously check whether or not the sound signal of the speakers 7, 8 is present in the received acoustic sound. Thus, the controller of the smart phone 9 can detect the beeps of the speakers 7, 8.

In order to detect and analyze the sound signal of the speakers 7, 8 an application is installed on the smart phone 9. FIG. 2 shows a flow diagram of a method for operating the smart phone 9. In a first step S1, a computer program or an application is installed on the smart phone 9. Then, the application is launched in a step S2. In a third step S3, the controller of the smart phone 9 checks continuously whether the sound signal is output by the speakers 7, 8. Here, no specific display is generated by the smart phone 9, unless the sound signal is detected. This means that the smart phone 9 checks in the background whether the received acoustic sound comprises the sound signal of the speakers 7, 8. If a beep is detected, a display or HMI is generated on the display means of the smart phone 9, the HMI indicating the measured distance. This display is generated in a step S4. Further, if no beep is detected for a predefined period of time, the method returns to step S3, wherein the smart phone 9 continuously checks in the background whether or not the sound signal is generated.

As shown in FIG. 3, different repetition rates R0 to R3 can be applied for different distance values d0 to d3 between the vehicle 2 and an obstacle 12 present in the surroundings of the vehicle 2. Thus, different repetition rates R0 to R3 are applied for the beeps output by the speakers 7, 8 as the sound signal. The controller of the smart phone 9 can determine the current repetition rate and generate the display based on the determined repetition rate. Since the repetition rate is set according to the distance between the vehicle 2 and the obstacle 12, the generated display or HMI indicates the current distance between the vehicle 2 and the obstacle 12.

Referring now to FIG. 4, different displays are generated by the smart phone 9 for different repetition rates R0 to R3. If no beep is output by the speakers 7, 8, the application installed on the smart phone 9 is running in the background, so that the smart phone 9 continuously checks whether the received acoustic sound has the specific sound signal of the speakers 7, 8, i.e. the beeps. Here, the driver can launch other applications on the smart phone 9, and a normal display 13 is generated on the display means which now is indicated by the reference sign 14. The display 13 or HMI is a user menu as it is already known from the prior art. If the beeps are detected by the smart phone 9, a display 15 is generated on the display means 14, which indicates the measured distance between the vehicle 2 and the obstacle 12. The display 15 is an HMI that comprises a vehicle image 16 showing the vehicle 2 from a plan view (bird view). Behind the vehicle image 16, a distance indicating image 17 is displayed that indicates the distance between the vehicle 2 and the obstacle 12. For this purpose, the distance indicating image 17 comprises bars, the number of which indicates the measured distance or the repetition rate of the beeps. For the repetition rate R3, four bars are shown in the display 15, which means that the distance is still relatively large. The bars can have different colours: The first bar near the vehicle image 16 can be displayed in a red colour that indicates a small distance. The second bar can be an orange one; the third bar can be displayed as a yellow bar; and the last fourth bar can be green.

If the beeps are output in the repetition rate R2, three bars can be displayed behind the vehicle image 16. This means that the distance between the vehicle 2 and the obstacle 12 is less than for the repetition rate R3. Furthermore, for the still higher repetition rate R1, only two bars can be displayed as the distance indicating image 17, which means that the distance is still less. Finally, only one bar can be displayed for the highest repetition rate R0, which actually can be a constant beep with a repetition rate of zero. Here, the distance between the vehicle 2 and the obstacle 12 is extremely small, which is indicated by the red colour of the only bar.

While the display 15 is generated on the display means 14, the controller of the smart phone continuously checks whether the beeps are still output by the speaker 7, 8. If no beeps are generated for a predefined period of time, the display 15 is deactivated and the normal HMI 13 is activated again, i.e. the user menu. The smart phone 9 can still continuously check whether the sound signal is generated again by any one of the speakers 7, 8. This application can be switched off by the user.

Thus, the smart phone 9 can detect the beeps of the speakers 7, 8 in the received acoustic sound which is received by the microphone of the smart phone 9. To detect the beeps, the acoustic sound is analyzed in the frequency domain. Here, the received sound can be Fourier-transformed into the frequency domain, and the amplitude of the frequency signal components can be determined by the controller of the smart phone 9. This is based on the realization that the beeps of the ultrasonic systems usually have a predetermined frequency spectrum which can be saved in the smart phone 9 as a comparison signal. Thus, the controller of the smart phone 9 can compare the received acoustic sound with the comparison signal to detect the beeps. An example of a frequency spectrum of one beep (a single beep) is shown in FIG. 5. In this example, the beep comprises three frequency signal components, namely for frequency values f1, f2, f3. For each frequency value f1, f2, f3, the beep has a different amplitude g1, g3, g2, respectively.

The beep also has a predefined duration, which can be 0.1 s, for example.

To detect a specific beep, the controller of the smart phone 9 analyzes the spectrum of the sound coming from the microphone. The window of analysis can be the duration of the beep to be detected. Using the predefined representation of the beep, a threshold value can be applied for each frequency value of the received sound. Another example of a beep can be as follows: The predefined beep can have the following frequency components F0 to F3 with assigned values of the amplitude G0 to G3, respectively:

F0=43 Hz; G0=−0.8 dB;
F1=1291 Hz; G1=11.8 dB;
F2=39119 Hz; G2=−6.0 dB; and
F3=65146 Hz; G3=−16.1 dB;

wherein the duration of the beep can be a value of 80 ms. The repetition rates of the beeps can be as follows:

R0=3 beeps/s,
R1=6 beeps/s and
R2=0 (continuous beep).

The assigned threshold values for the amplitude of each frequency component can be defined according to the following equation:

$$\text{Threshold} = -n \cdot \text{abs}(\text{Gain}) + \text{Gain},$$

wherein "n" indicates a constant value, for example 0.1, and "gain" indicates the amplitude of the respective frequency component of the specific beep. By way of example, the following threshold values are calculated for detecting the beep:

$$T0 = -0.1 \cdot \text{abs}(G0) + G0 = -0.08 - 0.8 = -0.88,$$

$$T1 = -0.1 \cdot \text{abs}(G1) + G1 = -1.18 - 11.8 = 10.62$$

$$T2 = -0.1 \cdot \text{abs}(G2) + G2 = -0.6 - -6.0 = -6.6, \text{ and}$$

$$T3 = -0.1 \cdot \text{abs}(G3) + G3 = -1.61 - -16.1 = -17.71$$

The following table shows an example of detecting the specific beep, which has the frequency components as mentioned above:

| Frequency [Hz] | Threshold [dB] | Level [dB] - beep sound detected | Level [db] - no beep detected, but background sound |
|---|---|---|---|
| 43 | −0.88 | −0.8 | 0.03 |
| 1291 | 10.62 | 11.8 | −44.00 |
| 3919 | −6.6 | −6.01 | −57.98 |
| 6546 | −17.71 | −16.12 | −55.50 |

As appears from the above table, the beep can only be detected, if all predefined frequency components of the received acoustic sound have the amplitude higher than the respective threshold value. Otherwise the received acoustic sound is considered to be a background sound.

If a beep is detected by the smart phone 9, the time period between two beeps is determined, and the repetition rate is calculated as a reciprocal value of the determined time period. According to the repetition rate, the display 15 is generated on the display means of the smart phone 9.

As shown in FIG. 1 and as already explained, the smart phone 9 can be coupled to the Internet 10 and to the database 11. From the database 11 data can be downloaded with said comparison signal. The comparison signal represents the predefined beep which is output by the speakers 7, 8. Thus, the comparison signal includes the predefined frequency spectrum with a predefined amplitude, as shown in FIG. 5, for example. The received acoustic sound can then be compared with the comparison signal to detect the beep. The comparison signal is downloaded for the given vehicle model as well as for the given vehicle's year of manufacture. The vehicle model and the year of manufacture can be input to the smart phone 9 by means of an input means, such as a touch display, for example.

The invention claimed is:

1. A method for supporting a driver of a motor vehicle while driving the vehicle, wherein a sound signal indicating an information generated by a driver assistance system of the vehicle is output by a sound output device of the driver assistance system, the method comprising:
   receiving acoustic sound by a microphone of a portable communication device and checking by the portable communication device whether or not the received acoustic sound comprises the sound signal of the driver assistance system; and
   upon detecting the sound signal of the driver assistance system, generating a display on a display means of the portable communication device in dependence on the information extracted from the sound signal,
   wherein, for supporting the driver while maneuvering the vehicle, a distance between the vehicle and an obstacle external to the vehicle is measured by means of a sensing device of the driver assistance system, wherein the output sound signal indicates the measured distance as the information and the display on the display means of the portable communication device is generated in dependence on the measured distance, and
   wherein to determine the distance based on the sound signal, beeps of the sound signal are detected and a repetition rate of the beeps is determined by the portable communication device.

2. The method according to claim 1, wherein the generated display indicates the measured distance.

3. The method according to claim 1, wherein the generated display comprises a vehicle image and a distance indicating image which indicates the measured distance.

4. The method according to claim 3, wherein the distance indicating image comprises bars, the number of which is set in dependence on the distance.

5. The method according to claim 1, wherein the sensing device is an ultrasonic sensor device.

6. The method according to claim 1, wherein the driver assistance system is a park assistant system.

7. The method according to claim 1, wherein by the portable communication device, it is continuously checked whether or not the sound signal is present in the received acoustic sound, wherein the display is generated upon detecting the sound signal.

8. The method according to claim 1, wherein after generating the display, it is continuously checked by the portable communication device whether or not the sound signal is still present, wherein the display is deactivated, if no sound signal is detected for a predefined period of time.

9. The method according to claim 1, wherein for detecting the sound signal in the received acoustic sound, a comparison signal is provided in the portable communication device and the received acoustic sound is compared with the comparison signal.

10. The method according to claim 9, wherein the comparison signal is downloaded from a database through the internet for at least one selected from the group consisting of: a given vehicle model, and a vehicle's year of manufacture.

11. The method according to claim 1, wherein for detecting the sound signal, at least one selected from the group consisting of: a frequency, and an amplitude of the received acoustic sound is analyzed by the portable communication device to determine whether the amplitude of the received sound at a predefined frequency value is greater than a predefined threshold value.

12. A computer program product which is formed for performing a method according claim 1, when it is executed on a portable communication device.

13. A portable communication device comprising:
   a microphone for receiving acoustic sound;
   a controller for processing the received acoustic sound;
   a comparison signal downloaded from a database through the internet for at least one selected from the group consisting of: a given vehicle model, and a vehicle's year of manufacture; and
   a display means,
   wherein the controller is adapted:
      to compare the received acoustic sound with the comparison signal;
      to detect in the received acoustic sound a predefined sound signal of a driver assistance system of a vehicle based on the comparison;
      to extract information from the sound signal generated by the driver assistance system; and
      to generate a display on the display means in dependence on the extracted information.

14. A system for a motor vehicle, comprising a driver assistance system and a portable communication device according to claim 13.

* * * * *